March 21, 1950  A. G. SWENSON  2,501,549
FLATIRON SUPPORTING MEANS
Filed April 4, 1946  5 Sheets-Sheet 4
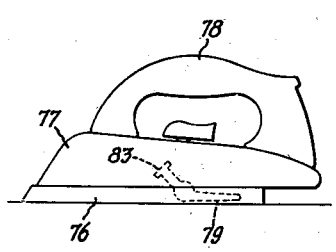
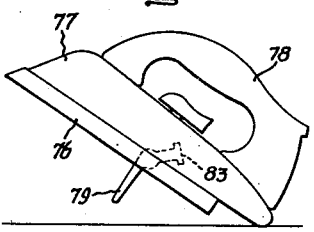
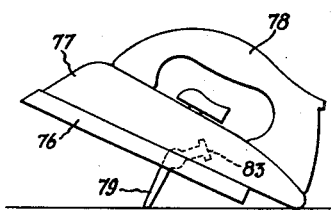
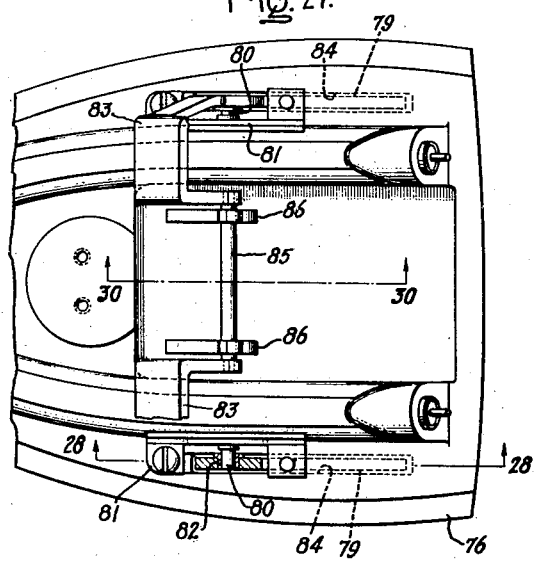
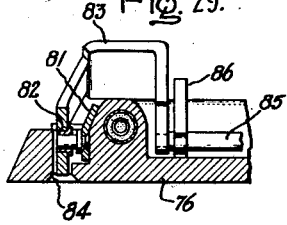
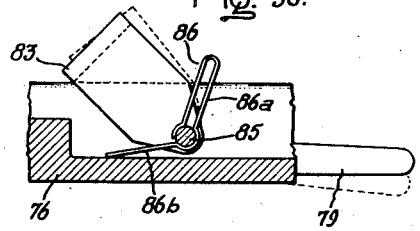
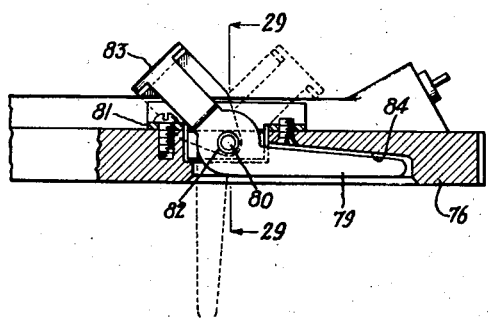
Inventor:
Alfred G. Swenson,
by
His Attorney.

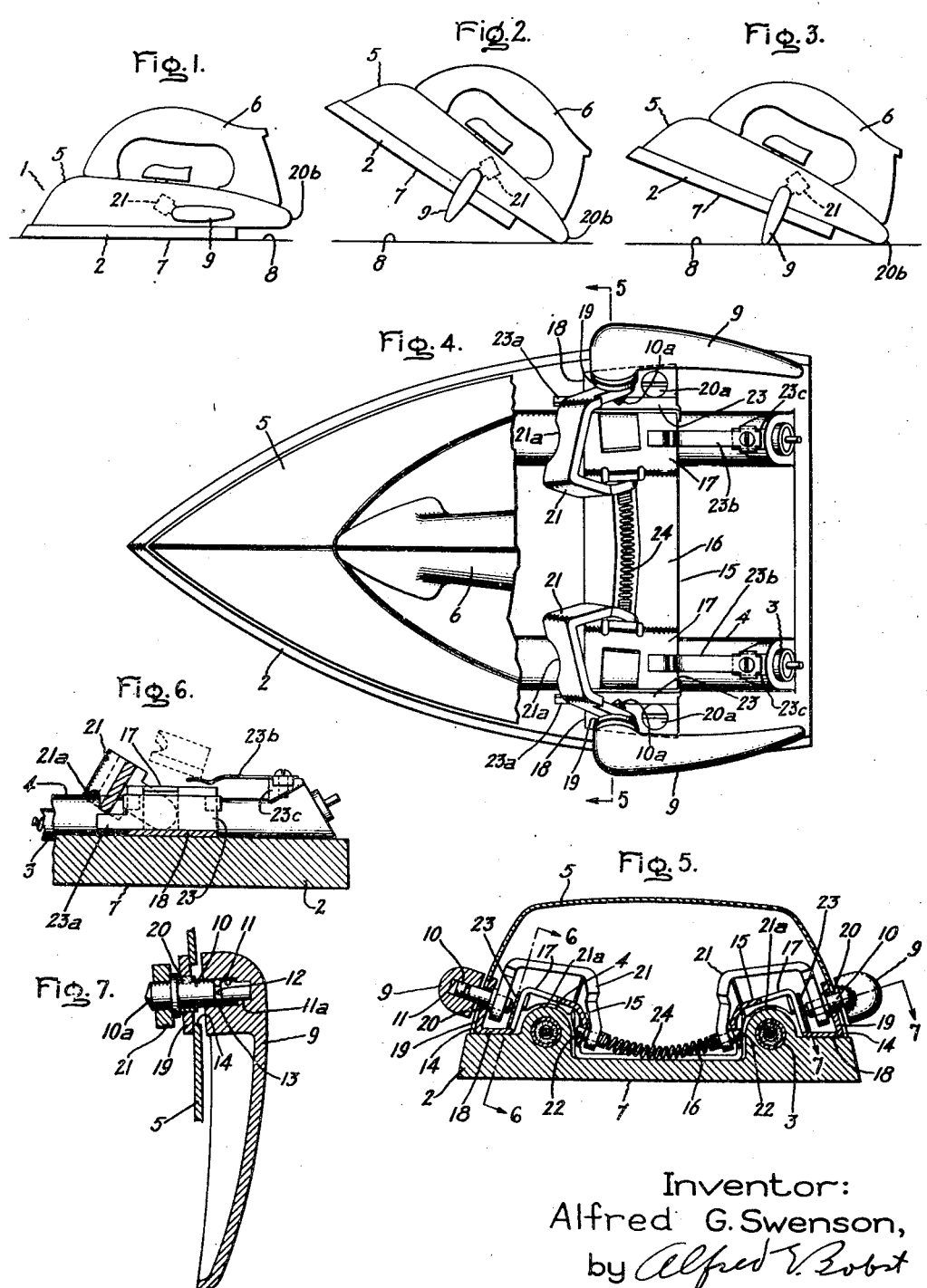

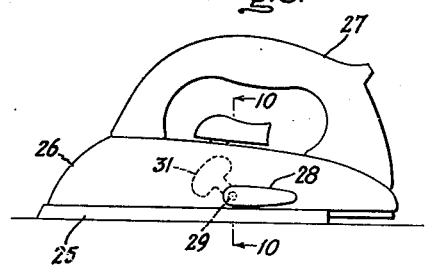
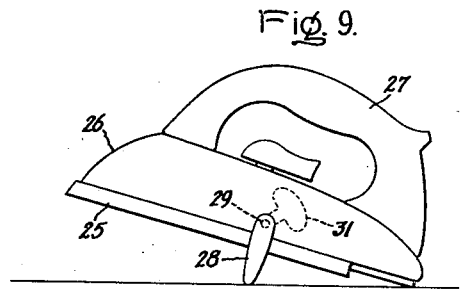
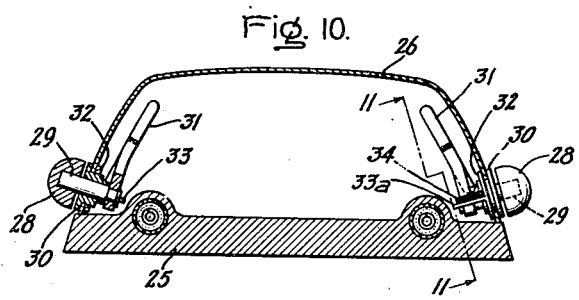
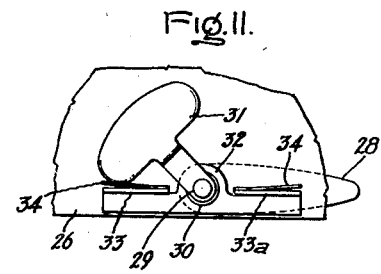
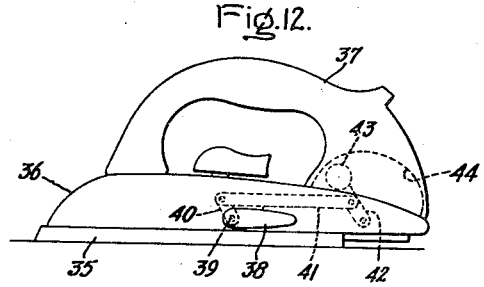
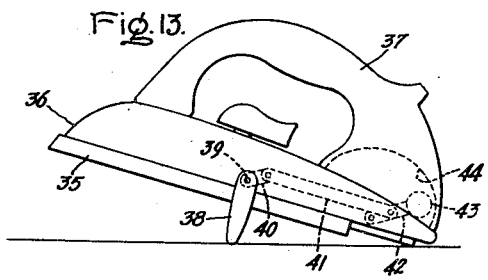
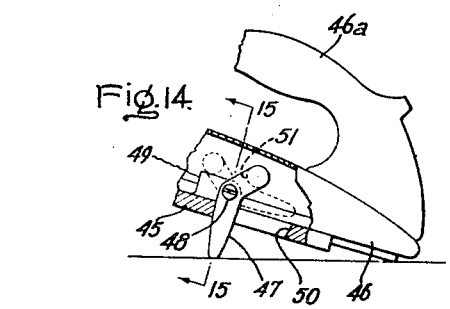
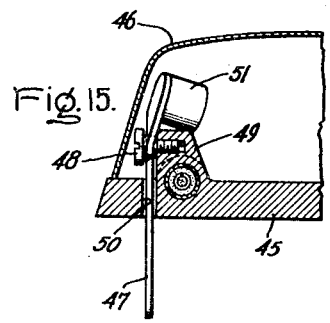
Inventor:
Alfred G. Swenson,
by Alfred V. Bobst
His Attorney.

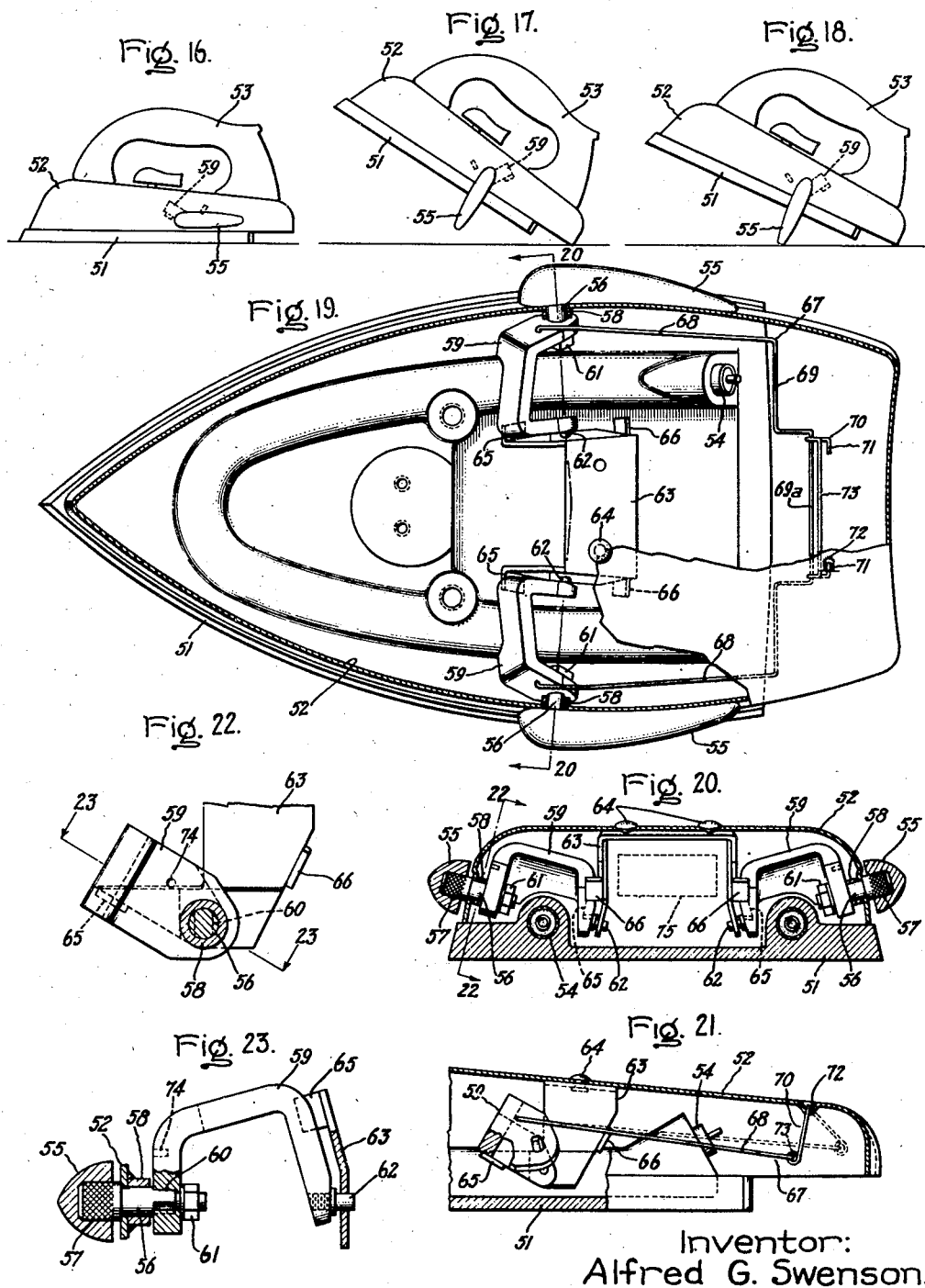

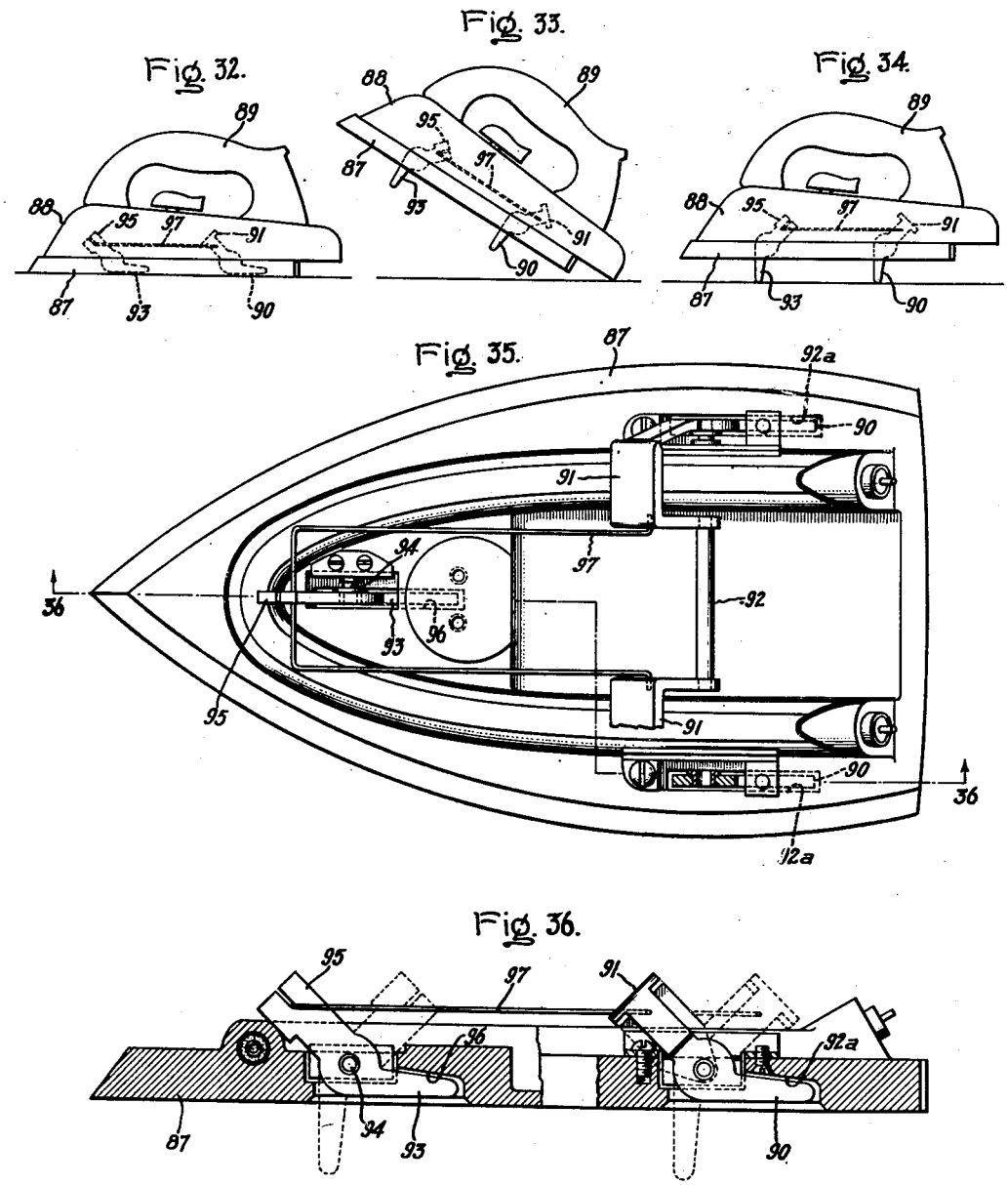

Patented Mar. 21, 1950

2,501,549

UNITED STATES PATENT OFFICE 2,501,549

FLATIRON SUPPORTING MEANS

Alfred G. Swenson, Ontario, Calif., assignor to General Electric Company, a corporation of New York Application April 4, 1946, Serial No. 659,608

11 Claims. (Cl. 38—79)

This invention relates to flatirons, and it has for its object the provision of a flatiron having improved means for supporting the iron body in an elevated rest position above a work surface, such as the surface of an ironing board.

In accordance with this invention, a support for the iron is provided. This support is movable from a retracted position, which it occupies during normal ironing operations, to an extended position wherein it supports the pressing surface of the iron above the work surface. Means are provided for actuating the support to its extended iron body-supporting position responsively to a manual upward tilting of the forward end of the iron through a predetermined degree of movement.

In accordance with one embodiment of this invention, the support comprises a pair of legs positioned on opposite sides of the iron body and mounted for pivotal movement from their retracted to their supporting positions. Connected to the legs are counterweight means which, when the iron is being operated for ironing purposes, functions to hold the legs in their retracted positions. However, when the forward end of the iron is tilted up through the aforementioned degree of movement, the counterweight means shifts so as to operate the legs to their extended positions.

The parts are so constructed and arranged that when it is desired to again iron, the iron body is simply moved forwardly from its position of rest with reference to the ironing board; this operation effects a relative movement between the legs and the iron body by the engagement between the legs and work surface, and thereby shifts the counterweight means to such position that it operates automatically to retract the legs.

For a more complete understanding of this invention, reference should be had to the accompanying drawings in which Fig. 1 is a side elevation of a flatiron embodying this invention, the iron being shown in a normal horizontal ironing position with reference to an ironing board; Fig. 2 illustrates the forward end of the iron elevated through a predetermined degree of movement to effect operation of the counterweight means to extend the supporting legs; Fig. 3 illustrates the supporting legs extended and supporting the iron body in its elevated rest position; Fig. 4 is a plan view of the flatiron of Figs. 1–3, a part being broken away so as to illustrate certain details of construction, this figure being drawn to a larger scale than Figs. 1–3; Fig. 5 is a sectional view taken through the line 5—5 of Fig. 4 and looking in the direction of the associated arrows; Figs. 6 and 7 are sectional views taken through the lines 6—6 and 7—7 respectively of Fig. 5 and looking in the directions of the respective arrows associated therewith; Fig. 8 is a side elevation of a flatiron embodying a modified form of this invention, the iron being shown in its ironing position; Fig. 9 is a view similar to Fig. 8 but illustrating the iron of Fig. 8 in its rest position; Fig. 10 is an enlarged sectional view taken through the line 10—10 of Fig. 8 and looking in the direction of the arrows; Fig. 11 is a sectional view taken through the line 11—11 of Fig. 10 and looking in the direction of the arrows; Fig. 12 is a side elevation of a flatiron embodying still another modified form of this invention, the iron being shown in its ironing position; Fig. 13 is a view similar to Fig. 12 but showing the iron in its rest position; Fig. 14 is a side elevation of an iron embodying still a further modified form of this invention; Fig. 15 is an enlarged sectional view taken through the line 15—15 of Fig. 14 and looking in the direction of the arrows; Figs. 16, 17 and 18 are views corresponding to Figs. 1, 2 and 3 but illustrating another modified form of this invention; Fig. 19 is an enlarged plan view of the iron of Figs. 16, 17 and 18, parts being broken away so as to illustrate certain details of construction; Fig. 20 is a sectional view taken through the line 20—20 of Fig. 19 and looking in the direction of the arrows; Fig. 21 is a fragmentary longitudinal sectional view taken through a portion of the iron shown in Figs. 16 to 20; Fig. 22 is a fragmentary sectional view taken along the line 22—22 of Fig. 20 and looking in the directions of the associated arrows; Fig. 23 is a sectional view taken along the line 23—23 of Fig. 22; Figs. 24, 25 and 26 also correspond to Figs. 1, 2 and 3 but as applied to another embodiment of this invention; Fig. 27 is an enlarged fragmentary plan view of certain of the elements shown in Figs. 24 to 26, parts removed so as to illustrate certain structural details; Fig. 28 is a sectional view taken through the line 28—28 of Fig. 27 and looking in the direction of the arrows; Fig. 29 is a sectional view taken through the line 29—29 of Fig. 28 and looking in the direction of the arrows; Fig. 30 is a sectional view taken through the line 30—30 of Fig. 27 and looking in the direction of the arrows; Fig. 31 is a sectional view similar to Fig. 30, but showing certain elements in different operative position; Figs. 32, 33 and 34 are views corresponding to Figs. 1, 2 and 3 but as applied to still another embodiment of this invention; Fig. 35 is a plan view of certain of the elements of the iron of Figs. 32 to 34; and Fig. 36 is a sectional view taken through the line 36—36 of Fig. 35.

Referring more particularly to Figs. 1–7 inclusive, this invention has there been shown as applied to an iron having an iron body 1. The iron body 1 comprises a metal soleplate 2 which is heated by an electrical heating element 3 of the sheathed type; this element is substantially of hairpin shape and is cast into the metal soleplate with the nexus or point at the forward end of the iron and the legs extending substantially to the rear end thereof, the soleplate being provided with an upright U-shaped rib 4 which receives the element, as clearly shown in Figs. 4 and 5. The iron body 1 is further provided with a shell 5 covering the soleplate, and attached to the shell is an operating handle 6. The soleplate 2 is provided with a bottom pressing surface 7 which normally lies in a horizontal plane when the iron is being used to press, for example on an ironing board or pressing work surface 8.

Suitable means are provided for supporting the iron in a rest position in which it is shown in Fig. 3, and wherein the pressing surface 7 makes a relatively small angle, such as about 20°, with the horizontal pressing position. This means comprises a pair of legs 9 positioned on opposite sides of the iron body outside of the shell 5 and intermediate the forward and rear ends of the iron body, as shown. One end of each leg 9 is attached to a shaft 10. For this purpose, the leg is provided with a bore 11 which receives the end of the shaft, as more clearly shown in Figs. 5 and 7; and the shaft at this end is keyed to the leg by cooperating flattened surfaces 11a on the shaft and leg. The part of the shaft received in the bore is provided with a circular recess 12, and mounted in this recess is a broken-ring spring 13 biased outwardly to engage the walls of the bore and hold the leg 9 to the shaft by its frictional contact with the bore. The shafts 10 rotate in axes which lie in a common plane extending transversely across the iron body at right angles to its longitudinal central axis. As shown more clearly in Fig. 5, these axes tip downwardly somewhat toward the center of the soleplate.

The shafts 10 project into the shell 5 through openings 14 provided for them in the side walls of the shell, and the inner ends of the shaft are journaled in a suitable supporting bracket 15.

The bracket 15 as shown, is provided with a central base member 16 which rests upon the top surface of the soleplate between the two arms of the rib 4; with a pair of inverted substantially U-shaped sections 17 straddling the ribs 4 at the sides; with a pair of flat sections 18 lying on the upper surface of the soleplate outside of the ribs 4; and with upright arms 19 at the sides adjacent the side walls of the shell. The latter arms function to journal the shafts 10, bearings 20 being provided for this purpose. The bracket 15 is secured to the soleplate by means of screws 20a.

When the iron is in its ironing position shown in Fig. 1, the legs 9 lie in a retracted idle position (Figs. 1 and 4) wherein they are substantially parallel to the pressing surface 7. They are, however, movable to an extended position (Figs. 2 and 3) substantially at right angles to the retracted position; and when the legs are in their extended positions they, together with the rear end 20b of the shell 5, operate to support the soleplate 2 in its elevated rest position of Fig. 3.

Counterweights 21 are provided for holding the legs in their retracted position of Fig. 1, and also to operate them automatically to their extended position of Figs. 2 and 3 responsively to the upward tilting of the forward end of the iron. The weights 21, as shown, have roughly a U-shape and they are positioned within the shell 5 to straddle the U-shaped sections 17 of the supporting bracket 15. The outer legs of these weights are rigidly secured to the shafts 10, while their inner legs are secured to shafts 22 which are journaled in the inner legs of the bracket section 17, as more clearly shown in Fig. 5. Preferably, the inner ends of the shafts 10 will be provided with conical bearings 10a which bear against pressure plates 23 mounted on the outer arms of the sections 17.

When the iron is in its normal horizontal ironing position of Figs. 1 and 6, the weights 21 occupy a forward position, as there shown, and thereby function to hold the legs 9 in their retracted position. The weights in this position rest upon the top of extensions 23a of the pressure plates 23 and are provided with notched sections 21a to clear the rib 4, as shown in Figs. 4, 5 and 6. However, when the iron handle 6 is grasped and the forward end tilted upwardly about a transverse axis toward its position of Fig. 2, the weights 21, of course, will be moved upwardly with the iron about the axes of movement of the shafts 10, and eventually will be moved to such a critical position with reference to these axes that their vertical moments equal those of the legs about these axes, and upon a slight additional upward movement of the iron body to the position of Fig. 2 the legs counterbalance the weights and move down to their extended position. This occurs when the iron body is inclined upwardly but a few degrees above the rest position of Fig. 3. Now the weights are in their dotted line position of Fig. 6, and the upper bars of the U-shaped bracket sections 17 may function as stops for the weights. When the legs have thus been extended, the iron may again be lowered, but the extended legs 9 will engage the board 8 and thereby prevent it from moving down from its rest position of Fig. 3.

Obviously, for the action above described, the center of gravity of each combined leg and counterweight, considered as a unit, will lie upwardly of and slightly forwardly of the pivot for the leg when the leg is retracted and the iron is horizontal. As the iron is tilted, this center of gravity will be shifted from the forward side of an imaginary vertical line through the pivots to the rearward side of this line, whereupon the counterweights will swing the legs downwardly and forwardly to extended position.

Preferably and as shown, the weights when in their dotted line leg extending position of Fig. 6 will not engage the bracket sections 17, but will contact the inner free ends of elongated spring bars 23b, shaped as shown in Figs. 4 and 6, and constructed to absorb the kinetic energy of the falling weights. The springs thereby function to eliminate the noise which would occur if the weights fell directly onto the bracket sections 17. The outer ends of the springs, as shown, are screwed to abutments 23c formed on the rib 4.

When it is again desired to iron, it is merely necessary to grasp the handle 6 and move the iron forwardly in the direction of a normal ironing stroke. The lower ends of the legs 9 are prevented from moving forwardly because of their engagement with the work surface 8, and as a result the legs rotate the shafts 10 and shift the weights 21 toward and beyond the critical position in the reverse sense. When this occurs, the weights will retract the legs to their idle position of Fig. 1. This may also be accomplished by lifting the iron body up and rotating it forwardly about a transverse axis.

While the two legs 9 and their counterweights 21 can function independently of each other, I prefer to cause them to tend to function together, and for this purpose interconnect them with a helical spring shaft 24. As shown, the ends of this shaft are connected to the shafts 22 which support the inner legs of the weights 21. While the spring shaft 24 normally causes the two support means to move in unison, it permits them to move independently of each other which is desirable in the event they be strained to move relatively to each other, as when the iron is moved with a rotary motion around a generally vertical axis at the same time that it is being operated toward its ironing position.

In the form of the invention shown in Figs. 8-11 inclusive, the support means at the two sides of the iron are entirely independent of each other, and moreover, are completely mounted on the iron shell. As shown, this embodiment comprises an ironing body having a soleplate 25, a shell 26 and a handle 27 all arranged as are the corresponding parts of the first embodiment described. Here also, the iron is provided with a pair of supporting legs 28 at the opposite sides of the shell, on the outside thereof and intermediate the forward and rear ends of the iron body. These legs are mounted upon and secured to shafts 29 which extend through openings provided for them in the shell, and are supported by bearings 30 supported in these openings. Mounted on and secured to the inner ends of the shafts 29 are counterweights 31.

When the iron is in its ironing position of Fig. 8 the counterweights occupy the position there shown, but when the iron is tilted upwardly beyond its rest position of Fig. 9, the counterweights move, as in the first embodiment, and carry the legs 28 to their extended position for the purpose of supporting the iron in its rest position of Fig. 9. When it is desired to resume ironing, it is merely necessary to shift the iron forwardly, which operation, as before, will cause the counterweights to return to their initial position and thereby shift the legs to their retracted positions; or to elevate the iron body and incline it forwardly.

A bearing and stop plate 32 secured to the inner surface of the shell is provided with forwardly and rearwardly extending wings 33 and 33a which function as stops for the forward and reverse positions of the counterweight, as shown more clearly in Fig. 11. If desired, suitable spring bumpers 34 or other sound deadening means may be provided on the stop wings 33 and 33a for engagement by the counterweights.

The embodiment illustrated in Figs. 12 and 13 is particularly useful whenever a shallow shell is provided in the iron and very little room is available for the counterweight structure. As there shown, the iron body comprises a soleplate 35, a shell 36, a handle 37 and supporting legs 38 arranged at the sides of the shell on the outside thereof intermediate the forward and rear ends of the iron. Here, the legs 38 are mounted upon shafts 39 which extend through the side walls of the shell as do the supporting shafts 29 of Figs. 8-11. Secured to the inner ends of these shafts 39 are crank arms 40 which by means of links 41 are connected with counterweight arms 42 located in the rear end of the shell 36, as shown. Attached to the upper ends of these arms 42 are counterweights 43; as shown, they are located above the shell in a hollow chamber 44 provided in the rear standard of the iron handle 37.

As before, the counterweights 43 operate to hold the legs 38 in their retracted position, as shown in Fig. 12, but when the forward end of the iron is tilted upwardly beyond its rest position of Fig. 13, the counterweights shift and automatically shift the legs 38 to their extended position shown in Fig. 13, and in which position they function to hold the iron in its position of rest.

As before, when it is desired to iron again, it is merely necessary to grasp the iron and shift the iron forwardly which operation automatically shifts the counterweights 43 back to their position of Fig. 12 to automatically return the legs 38 to their retracted positions; or by forwardly inclining the iron body, as before.

The supporting legs of any of the embodiments illustrated need not be placed upon the exterior of the iron shell, but may be placed on the interior thereof. The embodiment of Figs. 14 and 15 illustrates such an arrangement. Here, the iron body comprises a soleplate 45, a shell 46 and a handle 46a. Here also, a pair of supporting legs 47 are provided at the sides of the iron, but only one is illustrated. Here, however, the legs are located inside of the shell 46; they are pivotally mounted upon shafts 48 supported by means of bosses 49 formed on the soleplate. The legs move to their extended position through slots 50 provided for them in the soleplate, as shown.

Rigidly attached to the legs 47 are counterweights 51. It will be understood that the legs normally are supported by the counterweights in their retracted position, as in the other forms of the invention illustrated, and when the forward end of the iron body is tilted upwardly the counterweights move through the vertical to shift the legs to their extended position.

In the form of the invention illustrated in Figs. 16 to 23 inclusive, the iron body-supporting means is entirely supported by the shell. Here there is a soleplate 51, a cover shell 52 therefor and a handle 53. The soleplate is heated by heater 54, similar to heater 3. Here also a pair of supporting legs 55 are provided located on the outside of opposite sides of the shell and intermediate the forward and rear ends of the shell. These legs are secured to the outer ends of shafts 56 by knurled sections 57. These shafts extend into the shell 52 through openings provided for them in the shell and rotate in bearing collars 58 secured to the inner surfaces of the shell's walls. The inner ends of these shafts are secured to U-shaped counterweights 59 located in the shell and which are similar to counterweights 21 of the first embodiment, and which straddle heater 54 (Fig. 20). The shafts 56 are secured to the outer arms of these weights by complementary noncircular sections 60, as shown, and by nuts 61 threaded on the inner ends of shafts 56.

The inner arms of these weights 59 are fixed to shafts 62 which rotate in the lower ends of the two arms of an inverted U-shaped bracket 63. The nexus of this bracket is rigidly secured to the inner surface of the top wall of the shell by rivets 64.

The counterweights 59 when in their forward position of Figs. 16, 19, 20, 21, 22 and 23 hold the legs 55 in retracted position; and when in their rearward position of Figs. 17 and 18 hold the legs in their extended body supporting position shown in these two figures. And the weights are operated in precisely the same fashion as in the previously described embodiments of this invention.

Preferably motion limiting stops 65 and 66 will be provided on the two arms of bracket 63 for the forward and rearward positions respectively of the weights.

Here, the legs 55 are interconnected by means of a flexible wire 67 (Figs. 19 and 21) which tends to cause them to move in unison, but permits independence of motion between them. It serves the same function as does flexible shaft 24 of the first form. The wire has a U-shape— having a pair of side arms 68, and a nexus 69 which joins them at one end. The wire is positioned within the shell so that its arms 68 lie between the weights 59 and the shell, and so that they extend from the weights back to the rear end of the shell where the nexus 69 is located.

The nexus is supported for forward and rearward movements with respect to the shell by means of a U-shaped bracket 70 having the upper ends 71 (Fig. 19) of its two arms turned in and received in recesses 72 provided for them in the top wall of the shell, whereby the bracket 70 is suspended from this wall and may swing on it. The nexus 73 of this bracket at its ends is looped about the nexus 69 of the wire, as shown, so as to support this wire at the rear. Preferably and as shown, nexus 69 will be provided with an outwardly extending section 69a which is connected with the bracket 70 as shown. The forward ends of the wire arms 68 are inturned, as shown, and these inturned ends are received in sockets 74 provided for them in the outer arms of the counterweights 59.

The wire 67 tends to cause the legs 55 to move in unison; but because of its flexibility it will permit them to move independently in the event they be strained to move relatively to each other, as when the iron body is moved with a rotary motion around a generally vertical axis at the same time it is being operated from position of Fig. 18 to its ironing position of Fig. 16.

Here also, suitable noise dampening springs (not shown) may be provided for stops 65 and 66.

It will be observed that the entire body supporting mechanism is mounted in shell 52—no part being attached to the soleplate. This form is useful when a thermostat 75, shown in dotted lines in Fig. 20, is employed to control the heater 54, and because of its presence prevents the passage of an interconnecting shaft directly across the iron.

The form of the invention shown in Figs. 24 to 31 inclusive is similar to that shown in Figs. 14 and 15. As shown, this iron comprises a soleplate 76, shell 77 and handle 78. Here, as in Figs. 14 and 15, the pair of legs 79 are mounted within the shell 77. As shown, these legs are mounted upon shafts 80 which are fixed to brackets 81 secured to the soleplate, the legs having bushings 82 which receive the shafts.

The legs are movable from a retracted position shown in Figs. 24, 27, 28, 29 and 30 to their extended body supporting position of Figs. 25, 26 and 31 by counterweights 83 located within the shell, and which function as do the others both to hold the legs in retracted position while ironing, and to move them to their extended position by tilting the iron back to position of Figs. 25. Here, the weight are of U-shape, and are formed integrally with the legs, as shown, and here the weights engage the heater rib to limit its movement in the two directions, as shown in Fig. 28.

The soleplate is provided in its bottom pressing surface with recesses 84 in which the legs lie when retracted and from which they move to their extended positions.

The legs are interconnected to operate in unison by means of a rigid transverse shaft 85 located adjacent the soleplate, as shown, and in the axis of movement of the two legs.

One or more noise dampening springs 86 may be mounted on the shaft 85. Each spring has a hairpin section 86a frictionally engaging the shaft, as shown, and with a second section 86b extending from section 86a at an angle thereto. The angle between these two sections is somewhat greater than is the angle of swing of the legs 79. Thus, where as in this embodiment the legs 79 swing through an angle of 90° (Fig. 28), the angle between sections 86a and 86b is such that it will only move through an angle of 80 to 85° between the positions where the respective sections engage the soleplate. In operation, as the legs move in either direction, one section 86a or 86b of the springs will engage the soleplate before the counterweights engage the heater rib, but the momentum of the counterweights will carry them on to engage the heater rib against the restraining frictional forces of the springs. The kinetic energy of the weight-leg system is substantially absorbed in the springs, before the weights engage the heater rib. Noise is thereby substantially eliminated.

In the embodiment illustrated in Figs. 32 to 36 a leg and counterweight structure is used quite like that shown in Figs. 24 to 31, but an additional leg has been added adjacent the front end of the iron body.

This iron, as shown, has a soleplate 87, shell 88 and handle 89, and also a pair of supporting legs 90 at the sides. These legs have counterweights 91 and are interconnected by shaft 92. Legs 90 are provided with soleplate slots 92a. Legs 90, weights 91, shaft 92 and slots 92a all are constructed and arranged as are the corresponding elements of Figs. 24 to 31.

An additional similar leg 93 is provided at the front end of the iron. This leg is mounted on shaft 94 and is provided with an integral counterweight 95. And it operates from its soleplate slot 96.

Here the various counterweights hold the legs 90 and 93 in their retracted positions when ironing, as in Fig. 32. As the iron is tilted up to its angular position of Fig. 33, the weights extend the legs in the manner of the other forms disclosed. Then the body may be lowered so as to be supported by all three legs, but with its pressing surface parallel to its position when ironing, rather than at an angle thereto, as in the other embodiments. The iron, as in the other forms, is pushed forward to retract the feet, or it may be lifted and tilted forwardly.

If desired, the legs 90 and 93 may be caused to operate in unison by connecting them together by means of a drag link 97 having a U-shape. The nexus of this link is connected to the counterweight 95 of the front leg, while its two legs are connected to counterweights 91 of the rear legs, as shown.

In this arrangement, the legs may be somewhat shorter than in the others.

Also four or more legs may be used, if desired.

And in this case also spring noise dampeners (not shown) may be added.

While I have shown and described particular embodiments of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. A flatiron comprising an ironing body having a pressing surface operable in a normal horizontal ironing position on a work surface, a support, means pivotally mounting said support on said body for movement about an axis transverse of said body from an upper retracted position above said pressing surface downwardly and forwardly to an extended body-supporting position below said pressing surface and between the ends of the pressing surface wherein the support holds said pressing surface in a rest position above said work surface, and a pivoted counterweight operatively connected to said support to move said support, said counterweight being so positioned that the effective center of gravity of the combined support and counterweight is located upwardly of and closely forward of a vertical line through the pivotal mounting means of said support when the iron is in said ironing position and the support is retracted, whereby said counterweight holds said support in said retracted position when said iron is in said normal ironing position, and said counterweight is shiftable rearwardly of its pivot to move said support to its extended position by tilting the forward end of said body slightly upwardly from said normal position, thereby moving said support to said extended position.

2. A flatiron comprising an ironing body having a pressing surface operable in a normal horizontal ironing position on a working surface, said body having a forward end and a heel end, a support located forwardly of said heel end, means pivotally mounting said support on said body for movement about an axis transverse to the iron from an upper retracted position above said pressing surface, downwardly and forwardly about said pivotal mounting to an extended downward position below said pressing surface wherein said support is generally vertical with respect to said pressing surface, whereby said support and said heel end may hold said body in rest position on said work surface with said pressing surface tilted upwardly at the front at a relatively small angle to the horizontal, and a weight connected to said support so positioned that the effective center of gravity of the combined support and weight is located upwardly of and in front of a vertical line through the axis of the pivotal mounting by which the support is secured to the body when the iron is in horizontal position and the support is retracted, said weight holding said support in said retracted position when said iron is in said normal ironing position, and said weight and support being shiftable by tilting the forward end of said body upwardly from said normal position toward said rest position to operate said support to said extended position.

3. A flatiron comprising an ironing body having a pressing surface operable in a normal substantially horizontal position on an ironing work surface, said body having a forward end and a heel end, and means for holding said body in a rest position on said heel end with said pressing surface inclined upwardly toward the front at a relatively small angle to said horizontal position, said means comprising a pair of legs on opposite sides of said body between its ends, means mounting said legs on said body for pivotal movement on axes lying on a common plane transverse of said body from an upper retracted position above said pressing surface downwardly and forwardly about said axes to a generally vertical extended position below said pressing surface, and counterweight means in said body connected to said legs, said counterweight means being so positioned that the effective center of gravity of the combined legs and counterweight means is located upwardly of and close to a vertical line through the pivots of said legs when the iron is in ironing position and the legs are retracted, said counterweight means holding said legs in said retracted position when the iron is in said normal horizontal position, said counterweight means being movable to operate said legs to said extended body-supporting position by tilting the forward end of said body slightly upwardly from said normal position, and said counterweight means being moved back to restore said legs to said retracted position by the relative movement between said legs and said body effected by moving said body forwardly on said work surface.

4. A flatiron comprising a body having a soleplate that has a pressing surface operable in a normal horizontal ironing position upon a horizontal work surface, a pair of supporting legs positioned at opposite sides of said body between the forward and rear ends thereof for holding the forward end of said body up in a rest position wherein said pressing surface is elevated with respect to said ironing position, means mounting said legs on said body for pivotal movement from an upper retracted position above the pressing surface to a generally vertical extended body-supporting position below the pressing surface, counterweight means connected to said legs for holding them in said retracted position and so positioned that the effective center of gravity of the combined legs and counterweight means is located upwardly of and slightly forwardly of a vertical line through the pivotal mounting of the legs when the iron is in said ironing position and the legs are retracted, and said counterweight means being movable to operate said legs to said body-supporting position by the tilting upwardly of the forward end of said body, and said counterweight means being moved back to restore said legs to said retracted position by the relative movement between said legs and said body effected by moving said body forwardly on said work surface, and flexible means interconnecting said legs so as to cause them normally to move substantially in unison, but permitting relative movement therebetween.

5. A flatiron comprising an ironing body having a pressing surface operable in a normal substantially horizontal position on an ironing work surface, a heel end on said body, and means for holding said body in a rest position on said heel end with said pressing surface inclined upwardly toward the front at a relatively small angle to said horizontal position comprising a pair of legs on opposite sides of said body between its ends, means mounting said legs on said body for pivotal movement on axes transverse of the body from an upper retracted position above the pressing surface to a generally vertical extended body-supporting position below the pressing surface, counterweights connected to said legs respectively for holding them in said retracted position and so located that the effective center of gravity of the combined legs and counterweights is located upwardly of and forwardly of a vertical line through the pivotal axes of the legs when the iron is in said normal horizontal position and the legs are retracted, and said counterweights being movable with reference to said axes to operate said legs to said extended body-supporting position by tilting upwardly the forward end of said body, said counterweights being moved back to restore said legs to said retracted position by the relative movement between said legs and said body effected by moving said body forwardly on said ironing work surface, and a coiled spring shaft interconnecting said legs to cause them normally to move in unison between extended and retracted positions, but permitting relative movement therebetween.

6. A flatiron comprising an ironing body having a pressing surface operable in a normal horizontal working position, a plurality of supports all of which are pivoted to said body on axes transverse to said body and movable from retracted positions above said pressing surface downwardly and forwardly to extended positions substantially vertical to and below said pressing surface for holding said body with said pressing surface in a rest position which is removed from its working position with respect to a work surface and with said pressing surface in substantially parallel relation to said work surface, and biasing means connected to said supports rendered operative to move them to extended position by tilting said body in one direction about an axis transverse to the ironing body, said biasing means including a counterweight so positioned that the effective center of gravity of the combined supports and counterweight is located upwardly of and close to vertical line through the pivots between the supports and the body when the iron is in its working position, whereby said supports are retracted by relative movement between said supports and said work surface effected by forward movement of said body on said work surface.

7. A flatiron comprising a body having a soleplate that has a pressing surface operable in a normal horizontal ironing position, a pair of supporting legs positioned at opposite sides of said body between the forward and rear ends thereof, and a third supporting leg adjacent the forward end of said body, all of said legs being pivotally movable from a retracted non-supporting position above said pressing surface downwardly and forwardly to an extended generally vertical position with respect to the pressing surface of said body for holding said pressing surface in an elevated position with respect to its ironing position, counterweight means connected to said legs so positioned that the effective center of gravity of the combined legs and counterweight means is located upwardly and forwardly of a vertical line through the pivots where the legs are secured to the iron when the iron is in ironing position and the legs are retracted, said counterweight means holding said legs in said retracted position and said counterweight means being movable to operate said legs to said body supporting position by the tilting upwardly of the forward end of said body, and connection means interconnecting all of said legs together so as to cause them to tend to move in unison.

8. A flatiron comprising a pressing body having a soleplate provided with a pressing surface, and said body also having a shell covering said soleplate, a pair of body-supporting legs adjacent the opposite sides of said shell and intermediate its ends, pivotal means supporting said legs for movement from a retracted non-supporting position with respect to said body to an extended body-supporting position with respect thereto, weight means within said shell attached to said legs and so positioned that the effective center of gravity of the combined legs and weight is located upwardly of and close to a vertical line through the pivots of said legs when the iron is in ironing position and the legs are retracted, said weight means biasing said legs to one or the other of said positions depending upon the angular position of said body on an axis transverse to said body, and a flexible connection member interconnecting said legs so that they tend to move together to and from said positions, said member having a pair of arms pivotally connected to said legs respectively, and extending from said legs toward one end of said shell, and a third arm at said one end extending transversely of said shell and interconnecting said pair of arms and a support within said shell movably suspending said third arm and consequently said pair of arms.

9. A flatiron comprising a pressing body having a soleplate provided with a normally horizontal pressing surface, and said body also having a shell covering said soleplate, a pair of body-supporting legs adjacent the opposite sides of said shell and intermediate its ends, shafts journaled in the sides of said shell transversely of the pressing body supporting said legs for pivotal movement, from a retracted non-supporting position with respect to said body above and generally parallel to said pressing surface when it is in said normal horizontal position, to an extended body-supporting position with respect to said body below and generally vertical to said pressing surface, weights attached to said legs and so positioned that the effective center of gravity of the combined legs and weights is located upwardly of and close to a vertical line through said pivot shafts, said weights biasing said legs to one or the other of said positions depending upon the angular position of said body on a transverse axis, a flexible substantially U-shaped member within said shell located with its two arms adjacent the sides of said shell and its nexus in the rear end thereof, means pivotally interconnecting the forward ends of said arms with said two legs, and means pivoted to the inner surface of the top wall of said shell suspending said nexus.

10. A flatiron comprising a pressing body having a soleplate provided with a normally horizontal pressing surface and a shell covering said soleplate, a pair of body-supporting legs at opposite sides of said shell on the outside thereof, means mounted on said shell pivotally supporting said legs for movement on axes transverse to said shell from a retracted non-supporting position with respect to said body above and generally parallel to said pressing surface when it is in said normal horizontal position, to an extended body-supporting position with respect to said body below and generally vertical to said pressing surface, weight means within said shell attached to said legs upwardly of and forwardly of a vertical line through the axes of said pivotal supports when said legs are in said retracted position, said weight means biasing said legs to one or the other of said positions depending upon the angular position of said body on an axis transverse thereto, a flexible U-shaped wire within said shell located with its two arms adjacent the sides of said shell and its nexus in the rear end thereof, means pivotally interconnecting the forward ends of said arms with said two legs, a link vertically positioned within said rear end of said shell when said pressing surface is in said normal horizontal position, means pivotally connecting the upper end of said link with the top wall of said shell, and means pivotally connecting the lower end of said link with said nexus whereby the nexus is mounted for backward and forward movements in said shell when said legs move to said retracted and extended positions, said wire tending to cause said legs to move in unison and to permit relative movement between them.

11. A flatiron comprising an ironing body having a normally horizontal pressing surface when in working position, supports for holding said body with said pressing surface in a rest position which is removed from its working position with respect to a work surface, means pivotally mounting said supports on said body for movement from a retracted position with respect to said body above said pressing surface to an extended supporting position with respect to said body below said pressing surface, weight means connected to said supports and so positioned that the effective center of gravity of the combined supports and weight means is located upwardly of and forwardly of a vertical line through the pivotal mounting of the supports when the iron is in said working position and said supports are in retracted position, said weight means being rendered operative to move said supports to said extended position by tilting said body in one direction about an axis transverse to the iron and to retract said supports to said retracted position by tilting said body in the reverse direction on said transverse axis, and shock absorbing means for absorbing the kinetic energy of said weight means only substantially when said supports reach said extended position, said shock absorbing means being mounted on said body and in line with said weight means and adapted to be contacted by said weight means when said weight means moves to support-extending position.

ALFRED G. SWENSON.

REFERENCES CITED

The following references are of record in the file of this patent:

UNITED STATES PATENTS

| Number | Name | Date |
| --- | --- | --- |
| 514,492 | Nugent | Feb. 13, 1894 |
| 2,203,276 | Davis | June 4, 1940 |
| 2,286,284 | Kremer | June 16, 1942 |
| 2,308,106 | Reid | Jan. 12, 1943 |
| 2,332,745 | O'Connor | Oct. 26, 1943 |

FOREIGN PATENTS

| Number | Country | Date |
| --- | --- | --- |
| 49,545 | Sweden | Aug. 4, 1919 |